(12) United States Patent
Phely (10) Patent No.: US 8,491,451 B2
(45) Date of Patent: Jul. 23, 2013

(54) ROLLER WITH SEMI-HOLLOW PNEUMATIC TYRES FOR AGRICULTURAL MACHINERY, NOTABLY A ROLLER THAT CAN BE COMBINED WITH A SEED DRILL OR A GROUND PREPARATION TOOL

(75) Inventor: Olivier Phely, Thenisy (FR)

(73) Assignee: Otico, Chalmaison (FR)

( * ) Notice: Subject to any disclaimer, the term of this patent is extended or adjusted under 35 U.S.C. 154(b) by 1289 days.

(21) Appl. No.: 12/133,621

(22) Filed: Jun. 5, 2008

(65) Prior Publication Data
US 2008/0318747 A1 Dec. 25, 2008

(30) Foreign Application Priority Data
Jun. 19, 2007 (FR) ..................... 07 04359

(51) Int. Cl.
*E01C 19/23* (2006.01)
*A21B 29/04* (2006.01)

(52) U.S. Cl.
USPC ............... 492/30; 492/16; 492/38; 492/39; 492/40; 492/54; 492/56; 29/895.3; 172/537

(58) Field of Classification Search
USPC ............. 492/16, 29, 30, 38–40, 47–49, 54, 492/56; 29/895–895.32; 172/537; 111/157–159, 111/177–179, 182
See application file for complete search history.

(56) References Cited

U.S. PATENT DOCUMENTS

| 730,837 | A | * | 6/1903 | Nichols | 172/554 |
| 1,098,757 | A | * | 6/1914 | Rasmussen | 172/154 |
| 1,428,142 | A | * | 9/1922 | Canda | 492/1 |
| 1,637,424 | A | * | 8/1927 | Morrow | 172/537 |
| 3,338,315 | A | * | 8/1967 | Ketel | 172/537 |

FOREIGN PATENT DOCUMENTS

| DE | 32 18 635 A1 | 11/1983 |
| FR | 2 690 305 | 10/1993 |
| FR | 2 804 575 | 8/2001 |
| GB | 738112 | 10/1955 |

OTHER PUBLICATIONS

U.S. Appl. No. 12/482,565, filed Jun. 11, 2009, Phely, et al.

* cited by examiner

*Primary Examiner* — Sarang Afzali
(74) *Attorney, Agent, or Firm* — Oblon, Spivak, McClelland, Maier & Neustadt, L.L.P.

(57) ABSTRACT

This roller (10) comprises a tubular support structure (14) of horizontal axis (X-X) adapted to be rotatably mounted on a tractor-drawn support frame. A series of semi-hollow tyres with a dome-shaped profile are threaded onto this tubular support structure and enable a series of parallel furrows to be formed in the earth. The tubular support structure (14) comprises a framework formed by a plurality of bars (30) joined together by two circular end cheeks (32) between which these bars extend axially. The tyres (12) are mounted on the bars of the framework, forming with the latter an assembly that is connected for rotation and translation.

20 Claims, 6 Drawing Sheets

ROLLER WITH SEMI-HOLLOW PNEUMATIC TYRES FOR AGRICULTURAL MACHINERY, NOTABLY A ROLLER THAT CAN BE COMBINED WITH A SEED DRILL OR A GROUND PREPARATION TOOL

BACKGROUND

The invention relates to agricultural equipment comprising one or more rollers provided with a series of tyres threaded onto a tubular horizontal support, these tyres having a profile of a selected shape, particularly a dome-shaped profile, enabling a series of parallel furrows to be formed in the earth.

Rollers of this kind are described for example in the publications FR-A-2763279 and FR-A-2841733, in the name of the present Applicant.

These documents describe in detail the special tyres used, each of which comprises a central sleeve adapted to be threaded onto a tubular horizontal support, and a tread portion with a dome-shaped profile connected to the sleeve by two sidewalls that define an enclosed uninflated internal space which is annular in shape. This configuration ensures that the tread of the tyre is not flattened too much, while giving it sufficient flexibility to enable it to undergo deformation and be self-cleaning.

These rollers are conventionally drawn by a tractor, being placed behind ground working tools, while the roller may optionally be followed by other working tools.

A typical application is that of rollers for seed drills in which the tractor pulls a machine formed by a combination of semi-trailed tools comprising: groundworking tools; next, the roller with its dome shaped tyres which create furrows in the ground previously prepared by the tools; then seed drills which deposit grains or seeds in the furrows formed by the passage of the roller; and finally burying tools for burying the seeds.

In other applications, the roller equipped with its dome shaped tyres is placed behind groundworking tools, for example in order to break the stubble on the ground after harvesting. In this case, the roller is not followed by tools and serves essentially to level the ground.

In all the embodiments proposed hitherto, the tyres are threaded onto a large-diameter single central cylindrical tube constituting the tubular structure supporting the series of tyres.

However, by its nature, this massive structure has a considerable weight which does not contribute to the efficacy of the tool: in fact, for a seed drill, for example, it is important not to compact the ground but to form furrows in ground that has previously been prepared.

Moreover, the considerable mass of the roller gives it a substantial inertia. This inertia may be a problem when the agricultural machinery is travelling on roads, and when the roller is not supported by a raising mechanism, it is necessary to provide power braking systems, as described for example in the publication FR-A-2841733 in the name of the present Applicant.

Lastly, the final retail price of the roller is substantially increased by the costs of the materials and labour needed to manufacture this large-diameter tube.

BRIEF SUMMARY

One of the aims of the invention is to propose, for a roller of an agricultural machine of the type indicated above, a new configuration of support structure for the tyres which is substantially lighter than anything proposed hitherto, with a structure which is simpler and less expensive to produce.

The invention proposes for this purpose a roller for an agricultural machine of the type defined in the introduction as disclosed in the above-mentioned publication FR-A-2763279, i.e. a roller comprising a tubular support structure of horizontal axis adapted to be rotatably mounted on a tractor-drawn support frame, with a series of semi-hollow tyres having a profile of a selected shape, particularly a dome-shaped profile, which are threaded onto this tubular support structure, and enabling a series of parallel furrows to be formed in the earth.

According to one feature of the invention, the tubular support structure comprises a framework made up of a plurality of bars joined together by two circular end cheeks between which these bars extend axially, the tyres being mounted on said bars of the framework, forming with the latter an assembly that is connected for rotation and translation.

According to a very advantageous feature, the tyres comprise on their inner surface axially oriented notches, the shape and position of which are matched to the bars of the framework, so as to prevent the tyres from rotating relative to the tubular support structure.

The bars forming the tubular support structure may be straight bars or bars curved in the shape of a helical arc. They may be hollow, circular or rectangular in section, or flat.

The bars are preferably uniformly distributed around the circumference of the circular end cheeks, and may project radially relative to the circumference of the end cheeks.

They may also be joined together by at least one intermediate cheek arranged in a median region of the framework.

The roller according to the invention preferably comprises end flanges mounted on the respective cheeks, adapted to hold and axially grip the series of tyres threaded onto said tubular support structure.

At least some of the tyres may be mounted adjacent to one another or mounted with intercalary annular spacers interposed between them, threaded on the framework, so as to define a given interval that axially separates these tyres from one another. In the latter case, the annular spacers may comprise, on their inner side, notches the shape and position of which are matched to the bars of the framework, or on the other hand may have a continuous profile on their inner side.

BRIEF DESCRIPTION OF THE DRAWINGS

Some examples of the implementation of the invention will now be described, with reference to the attached drawings, in which the same reference numerals have been used from one Figure to another to denote elements that are identical or functionally similar.

DETAILED DESCRIPTION

FIGS. 1 to 6 show a first embodiment of an agricultural machine roller according to the invention.

Figures 1, 2:
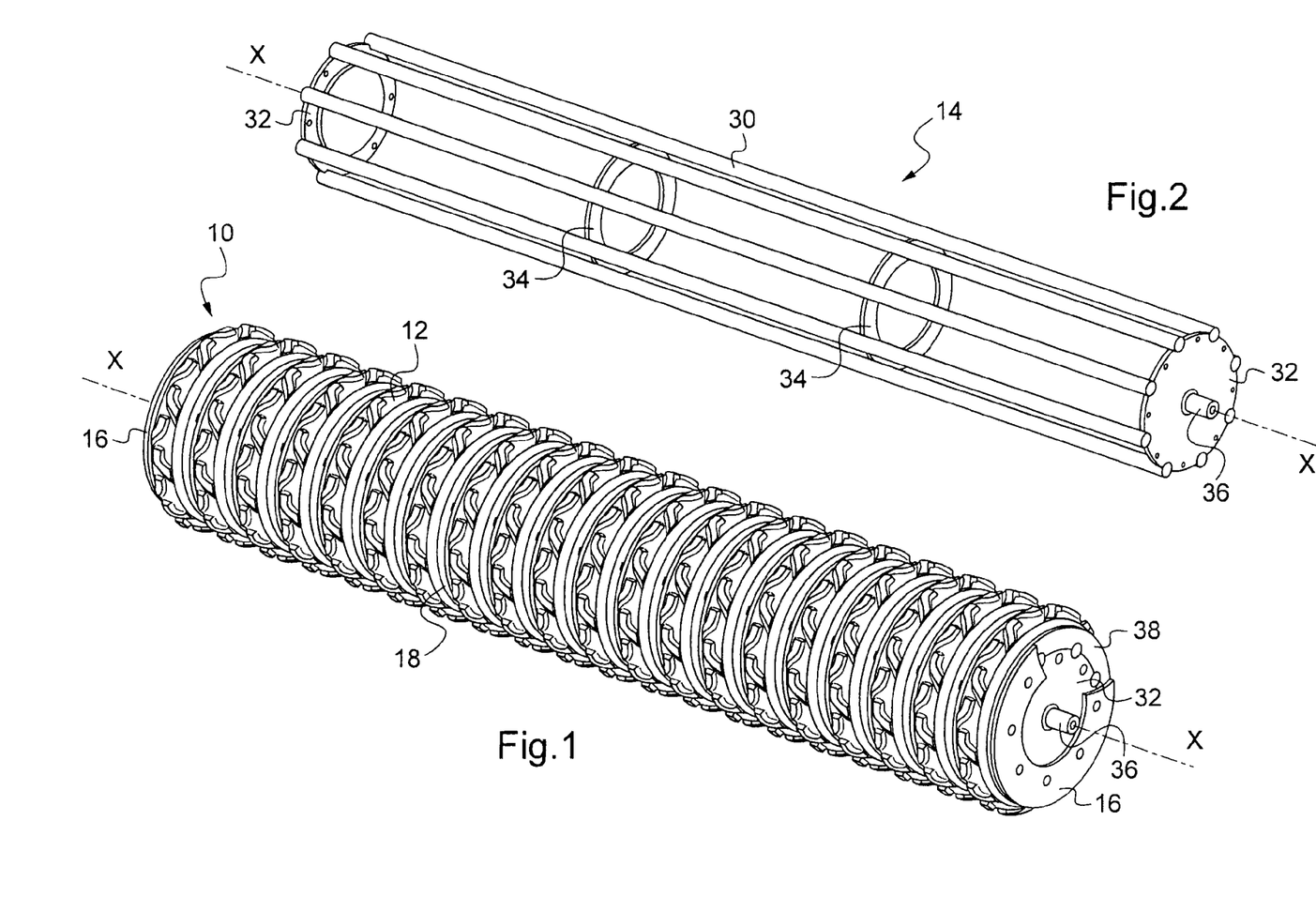
FIG. 1 is a perspective view, with a detail partly cut away, of a roller of an agricultural machine produced according to the teaching of the present invention.
FIG. 2 is a perspective view of the tubular support structure according to the invention, shown on its own.

This roller, generally designated 10, comprises a series of similar tyres 12 threaded successively onto a tubular support structure 14 mounted to rotate about a horizontal axis X-X.

The tyres are threaded on adjacent to one another and are held at each end of the stack by end flanges 16 that ensure that the tyres are gripped and held against one another. Reference may be made to the publication FR-A-2841733, and to the publication FR-A-2784331, both in the name of the present Applicant, for more details of the method of producing a roller of this kind from a stack of tyres.

The stack of tyres form, with the tubular structure that supports them, an integrated assembly which constitutes a roller capable of being mounted on a support frame (not shown) of an agricultural machine comprising other elements (seed drill, draw bar, etc), pulled along in a direction perpendicular to the axial direction XX of the roller 10. The typical dimensions (length x diameter) of such a roller are 3000×600 mm.

By the reaction of the tyres on the ground, the movement of the support frame causes rotation of the driven roller 10, and the tyres create parallel furrows in the ground, in which seeds may be sown, for example. The spacing between the furrows corresponds to the gap between the treads of the adjacent tyres, for example 125 mm. In order to adjust this spacing, e.g. to 150 mm, it may be possible to place intercalary annular spacers 18 between the adjacent tyres, the axial width of which will be selected as a function of the desired spacing of the furrows.

The special tyre suitable for the use mentioned above is of the general type described in the publication FR-A-2763279 mentioned hereinbefore, i.e. a tyre wherein the part intended to make contact with the ground which is to be worked (or with the road surface, in the case of a roller for mixed use) is a part forming a tread with a dome shaped profile, i.e. a rounded convex profile.

Such a profile generally comprises a single dome but may also, if appropriate, have a double dome, also known as a twin dome. The shape of the dome may be varied to suit the particular application, i.e. it may be more or less pronounced or flattened. By way of example, the height of the dome may be between 10 and 100 mm for a tyre width of 80 to 400 mm, these values being given solely as a guide. The invention also encompasses other types of profiles, notably flattened profiles. The outer surface of the profile, particularly of the dome or domes, may be smooth or provided with grippers defining positive or negative reliefs.

Figures 3, 4, 5, 6:
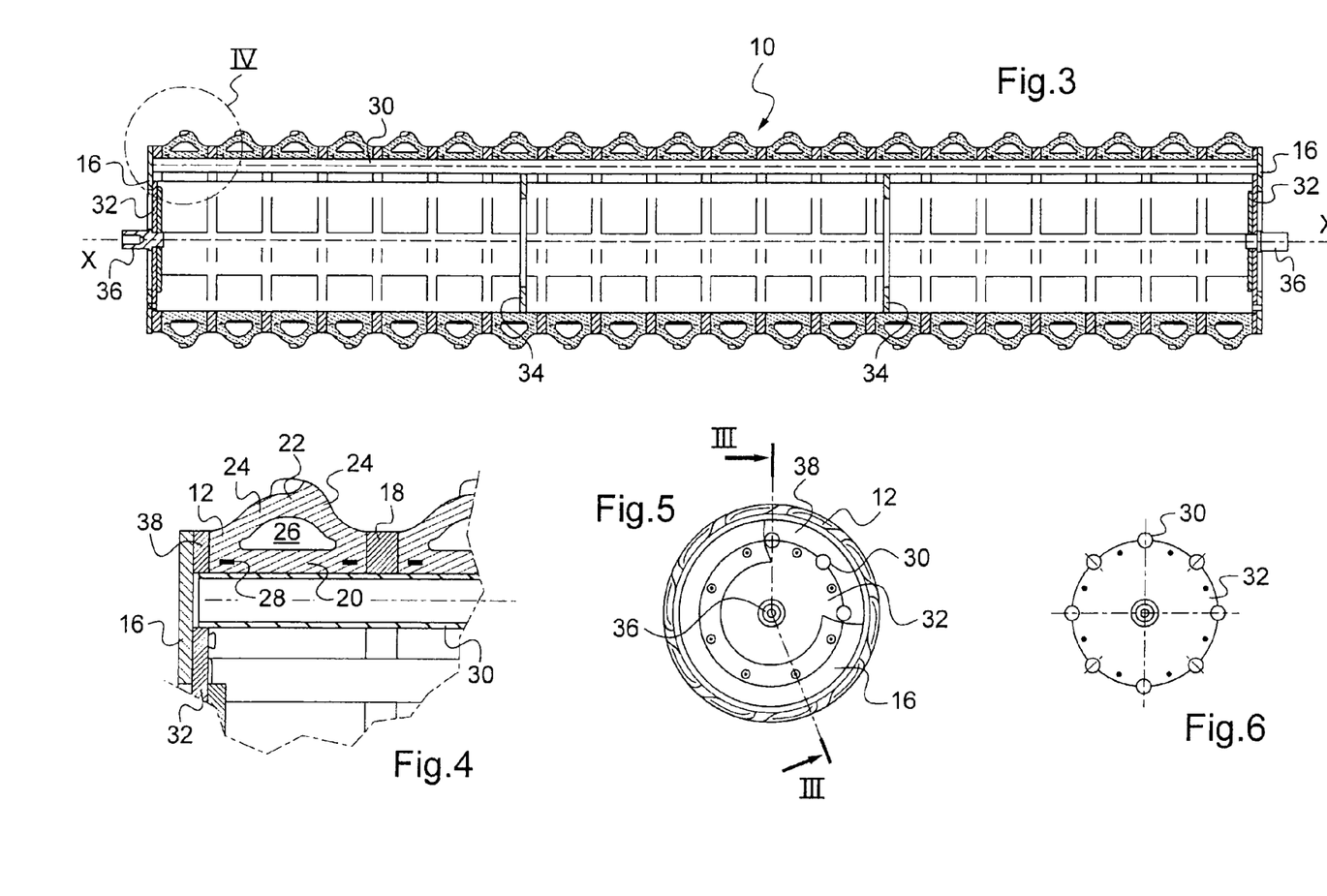
FIG. 3 is an elevation of the roller of FIG. 1, in section on the line III-III in FIG. 5.
FIG. 4 illustrates, in section, the detail designated IV in FIG. 3.
FIG. 5 is an end view, partially cut away, of the roller in FIG. 1.
FIG. 6 is an end view of the support structure in FIG. 2, shown on its own.

The structure of such a tyre comprises, as shown in section in FIG. 4, a central sleeve adapted to be threaded onto the support structure of the roller, and connected to the part 22 forming the tread by two opposing sidewalls 24, the part 20 forming the sleeve being widened by comparison with the tread 22.

The sidewalls 24 define, inside the tyre, an annular space 26 whose cross section is related to the cross section of the overall dome shaped profile of the tyre. This hollow annual space 26 is not inflated and is able to communicate with the ambient surroundings via an opening (not shown) passing through the thickness of the sleeve 20, to ensure pressure equalisation during use. In fact it is desirable that the tyre should be able to deform to some extent in the region between the tread 22 and the sleeve 20 to assist with detachment from the soil which otherwise would have a tendency to stick to the tyre in the region of the sidewalls 24. This deformation of the tyre, which confers on it sufficient flexibility to attenuate the deformations and be self-cleaning, is nevertheless limited by the dome shape, which prevents the tread from being flattened excessively.

The central sleeve 20 may be mechanically reinforced by one or more twisted cables or a retaining ring 28 embedded in the material of the tyre, in particular in order to ensure better holding on the support structure in spite of the mechanical stresses to which the tyre is subjected, which may be fairly intense and severe, particularly on the road.

In a manner characteristic of the invention, the support structure 14 consists not of a metal cylinder, as in the prior art, but of a framework formed from a plurality of bars 30 joined together at their respective ends by circular end cheeks 32 (FIG. 2).

There are eight bars 30 in the embodiment shown, but there could also be fewer (at least three) or more. They are preferably uniformly distributed over the circumference of the end cheeks 32. Moreover, in the embodiment shown, they project radially relative to the circumference of the end cheeks 32.

The bars 30 define a substantially tubular enveloping volume the external diameter of which corresponds to the diameter of the tyres intended to be mounted on this structure (typically, a diameter of 600 mm). In the embodiment shown, the bars 30 are hollow bars having a circular cross-section with an individual outer diameter of 80 mm.

Intermediate cheeks 34 may be arranged in median regions of the framework, so as to strengthen the latter by preventing excessive flexing of the bars 30 at this point.

The circular end cheeks 32 each have a hub 36 which enables the roller to be rotatably mounted on the support frame of an agricultural machine, for pulling the roller in a direction perpendicular to its axial direction X-X.

As can be seen from the cut-away section of FIGS. 1 and 5, the intercalary spacers 18 separating two adjacent tyres, and the end spacers 38 disposed between the last tyre in the series and the end flange 16, are provided with notches, the shape and position of which correspond to the different tubes 30 of the framework. These notches make it possible to connect the spacers 18 and 38 for rotation with the framework of the support structure 14. Alternatively, however, they may be replaced by a continuous profile on the inside of the spacers.

Figure 7A:
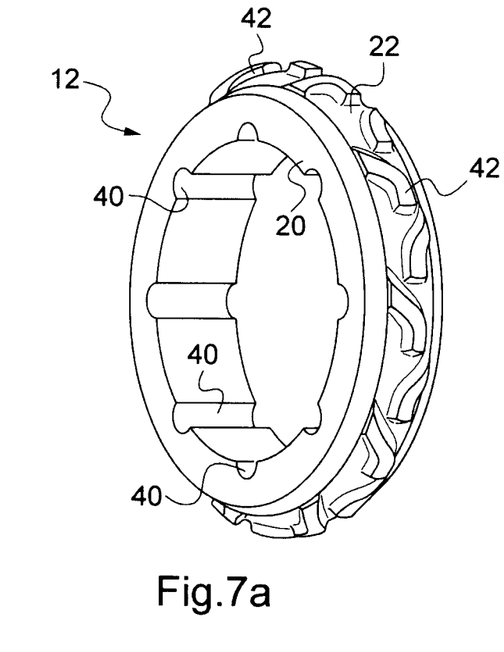
FIGS. 7a and 7b are views, in perspective and in section through an axial plane, respectively, of a first type of tyre capable of being fitted to form the roller of FIG. 1.
Figure 7B:
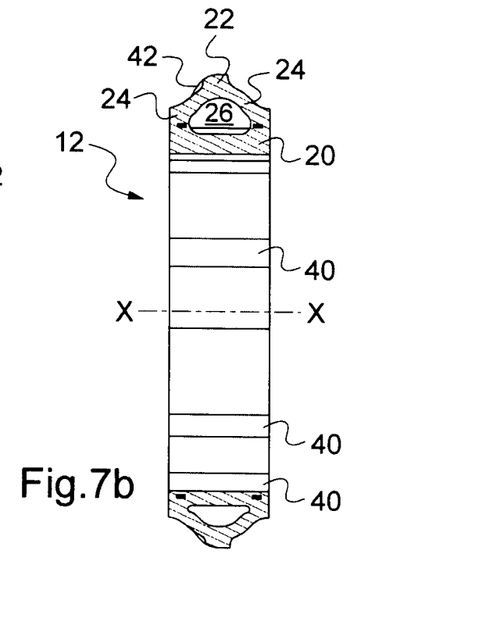

FIGS. 7a and 7b illustrate an embodiment of a tyre adapted to be fitted to the framework in FIG. 2, to form the roller shown in FIG. 1.

The tyre 12 is a tyre of a known type, semi-hollow with a dome-shaped profile as described previously. On its inner surface, i.e. on the side nearest the sleeve 20 adapted to make contact with the support structure 14, it comprises axially oriented notches 40.

The shape and position of the notches 40 correspond to the bars 30 of the framework, so as to immobilise the tyres against rotating relative to the framework that supports them. However, this feature is not essential, and the tyres may optionally have a smooth internal surface provided that the gripping of the tyres, notably as a result of their radial elasticity, is sufficient to prevent any relative slipping during rotation relative to the structure that supports them, in the majority of working conditions likely to be encountered by the roller.

In the embodiment shown in FIGS. 7a and 7b, the tyre further comprises, on its tread 22, grippers such as 42, formed on the periphery of the tyre and distributed in the circumferential direction. In particular, the presence of these grippers introduces a discontinuity in the furrow as the roller travels along to form furrows in the ground, thus promoting crumbling of the soil and the creation of fracture zones capable of catching water in the event of rain and limiting the run-off along the furrow, especially on sloping ground.

However, it is possible, as an alternative, to mount tyres with a smooth tread on the support structure 14.

Figure 8A:
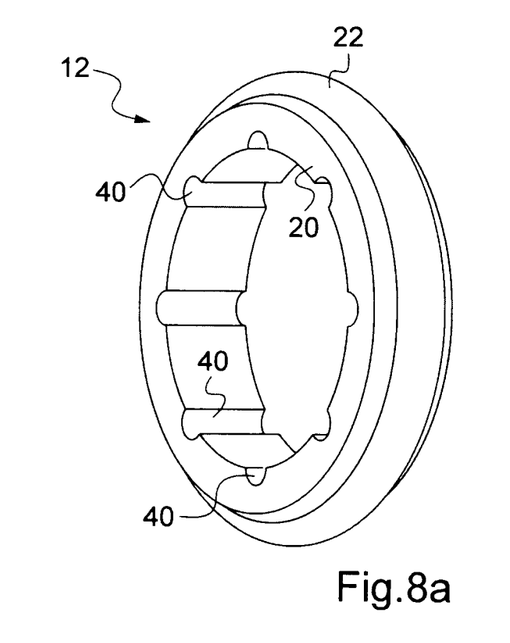
FIGS. 8a and 8b are views, in perspective and in section through an axial plane, respectively, of a second type of tyre capable of being fitted to form the roller of FIG. 1.
Figure 8B:
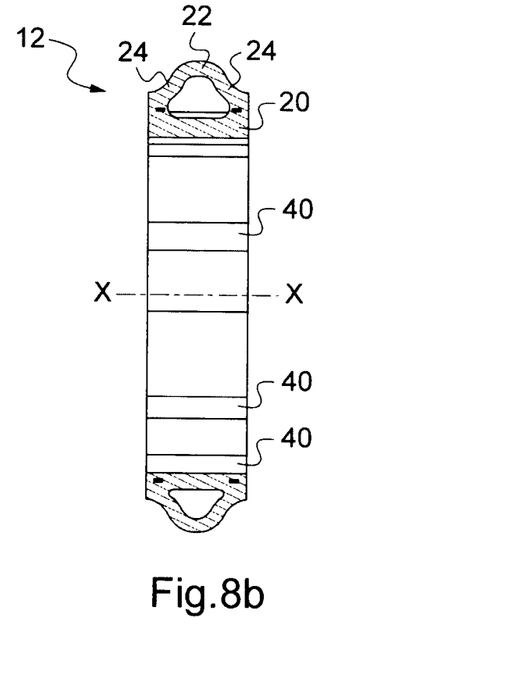

FIGS. 8a and 8b show an example of a smooth tyre of this kind, which can be used in particular in conjunction with scrapers positioned between the tyres, the action of which would not be obstructed by the presence of grippers on the tread.

A number of alternative embodiments of the framework that constitutes the support structure 14 may be envisaged.

Figures 9, 10, 11:
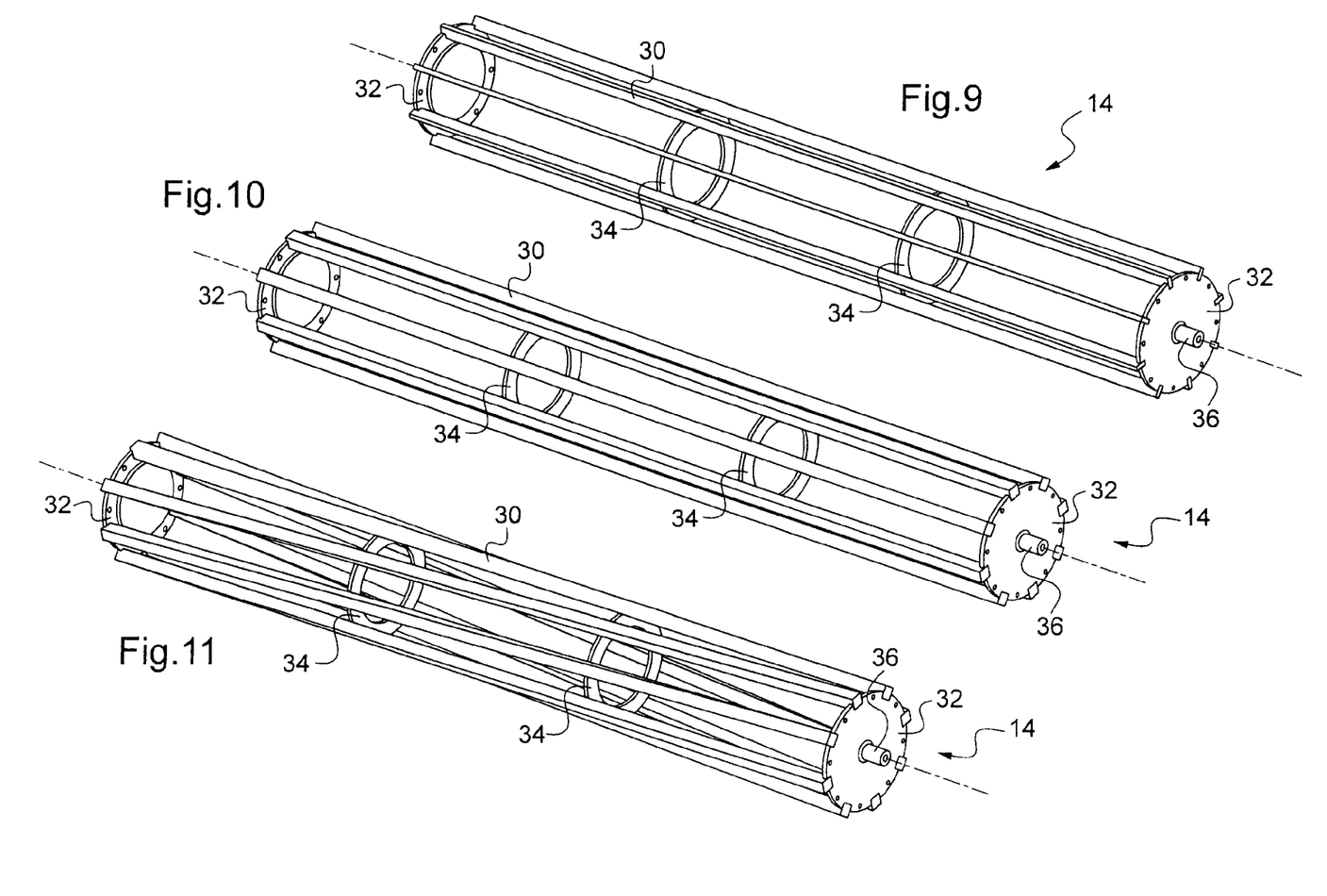
FIGS. 9, 10 and 11 are homologous to FIG. 2, for three possible alternative embodiments of the tubular support structure according to the invention.

Thus, in the embodiment shown in FIG. 9, the hollow tubes of circular section from FIG. 2 have been replaced by bars 30 in the form of flats, the longest direction of which is oriented radially, so as to allow better securing of the tyres when they are threaded onto the framework 14. These bars may, for example, have a section measuring 40×80 mm.

In the alternative embodiment shown in FIG. 10, the bars 30 consist of hollow tubes of square cross-section, for example measuring 80×80 mm.

In the different embodiments shown in FIGS. 2, 9 and 10, the bars 30 are rectilinear, i.e. they extend along generatrices of a straight cylinder the directrix of which would be formed by the circumference of the end cheeks 36.

However, this configuration is not restrictive: in fact, as shown in FIG. 11, it may be envisaged that the bars 30 should be curved substantially into the shape of a helical arc, with an offset of, for example, $\frac{1}{8}^{th}$ of a turn between the two end cheeks 32.

The inner surface of the tyres 12, in contact with the support framework 14, is adapted as necessary to the particular configuration of the framework.

Figure 12A:
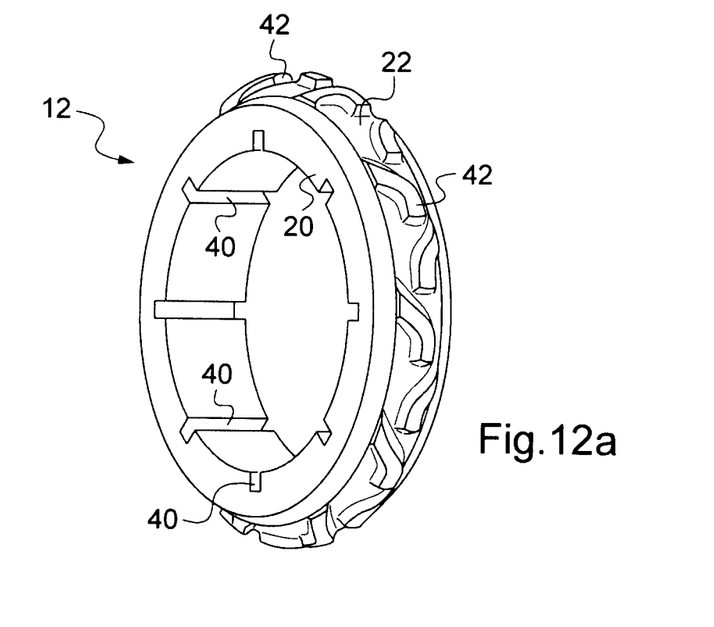
FIGS. 12a and 12b are views, in perspective and in section through an axial plane, respectively, of a tyre capable of being fitted on the support structure of FIG. 9.
Figure 12B:
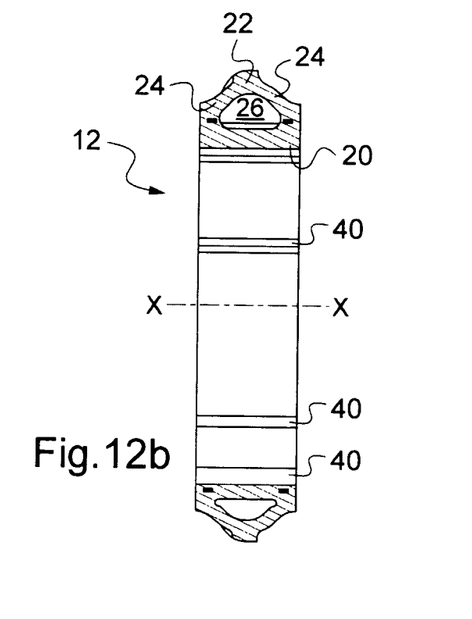

Thus, FIGS. 12a and 12b are homologous to FIGS. 7a and 7b for a framework the bars of which consist of flats of rectangular cross-section: in this case, the notches 40 formed on the inner surface of the tyre are notches of rectangular cross-section, the depth and width of which are adapted to the section of the flats that constitute the bars of the support framework.

Figure 12C:
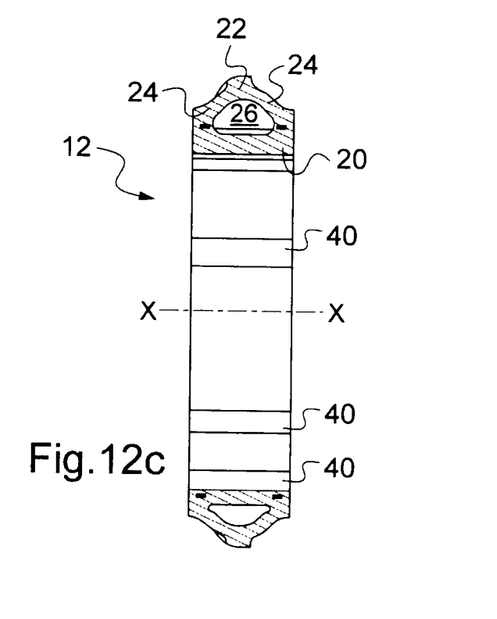
FIG. 12c is homologous to FIG. 12b, for a tyre adapted to be mounted on the support structure of FIG. 11.

FIG. 12c shows an embodiment of a tyre adapted to a framework in which the bars are not straight but curved in a helical arc as shown in FIG. 11: the notches 40 must then, as shown, have a shape homologous to this particular configuration of the bars of the framework.

Figure 13:
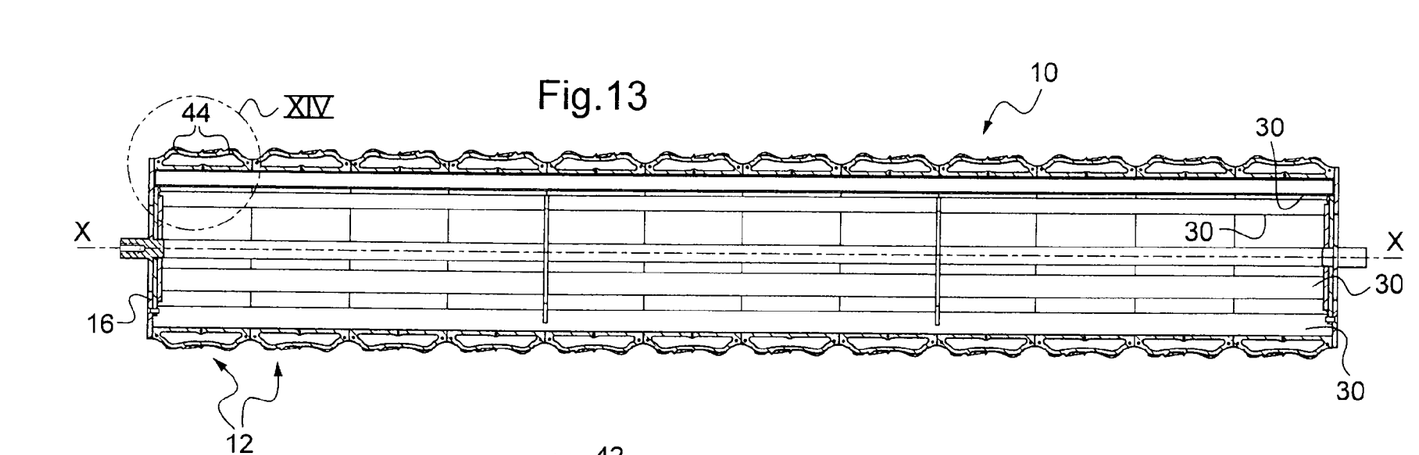
FIG. 13 is a view analogous to FIG. 3 in an alternative embodiment in which the tyres have a profile in the shape of a double dome or twin dome.

FIG. 13 shows, in section, a roller analogous to that in FIG. 3. However, the profile of each of the tyres 12 comprises two domes 44 which are spaced apart and less pronounced than in FIG. 3, i.e. lower in height. Moreover, each tyre 12 has a greater width than in FIG. 3. The result of this is that the profile of the tyre is substantially flattened.

Figure 14:
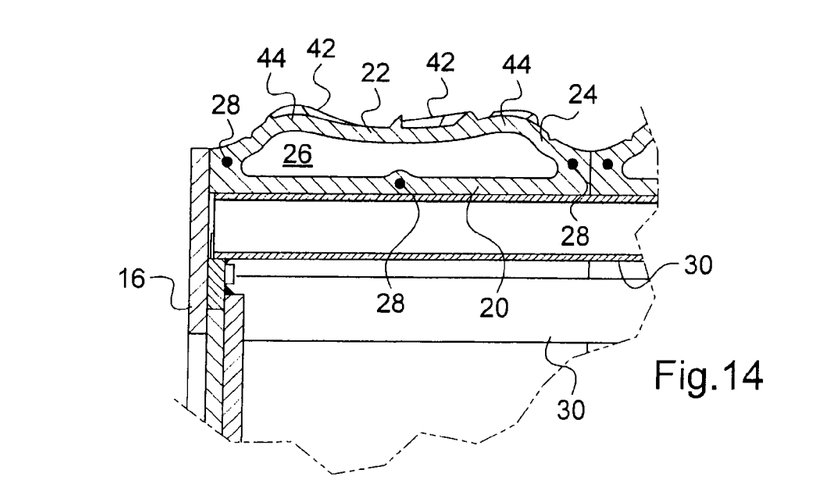
FIG. 14 shows, in section, the detail designated XIV in FIG. 13.

The detail of FIG. 14 shows that the part 22 forming the tread comprises two domes 44, also referred to as "twin domes". In the embodiment, the domes 44 are provided with grippers 42, but they could also have a smooth surface. The part 22 is attached to the central sleeve 20 by two opposing sidewalls 24. An annular space 26 of flattened cross-section is thus delimited inside the profile of the tyre. Reinforcement cables 28 are embedded in the material of the tyre to ensure mechanical framework.

The invention claimed is:

1. A roller of an agricultural machine that can be combined with a seed drill or a ground preparation tool, comprising:
 a tubular support structure of horizontal axis adapted to be rotatably mounted on a tractor-drawn support frame; and
 a series of semi-hollow tires having a profile of a selected shape, which are threaded onto the tubular support structure, enabling a series of parallel furrows to be formed in the earth,
 wherein the tubular support structure comprises a framework made up of a plurality of bars joined together by two circular end cheeks between which these bars extend axially, and the tires are mounted on said bars of the framework to form an assembly that is connected for rotation and translation, and
 wherein the tubular support structure further comprises end flanges mounted on the end cheeks such that the plurality of bars do not pass through the end flanges, the end flanges being adapted to hold and axially grip the series of tires threaded onto said tubular support structure.

2. The roller according to claim 1, further comprising intercalary annular spacers threaded on the framework between at least some of the tires so as to define a given interval that axially separates these tires from one another.

3. The roller according to claim 2, wherein an inner side of the intercalary annular spacers comprises notches and a shape and position of the notches are matched to the bars of the framework.

4. The roller according to claim 2, wherein an inner side of the intercalary annular spacers have a continuous profile.

5. The roller according to claim 1, wherein an inner surface of the tires comprises axially oriented notches, and a shape and position of the notches are matched to the bars of the framework so as to prevent the tires from rotating relative to the tubular support structure.

6. The roller according to claim 5, wherein
 each of the plurality of bars of the tubular support structure is mounted on an outermost face of the end cheeks in a radial direction of the roller, and
 the tires are mounted on the plurality of bars on an innermost face of each of the tires in the radial direction.

7. The roller according to claim 1, wherein the bars forming the tubular support structure are hollow bars.

8. The roller according to claim 7, wherein the bars are bars of circular or rectangular section.

9. The roller according to claim 1, wherein the bars are also joined together by at least one intermediate cheek arranged in a region of the framework between the end cheeks.

10. The roller according to claim 9, wherein the intermediate cheek is overlapped by one of the tires in a radial direction of the roller.

11. The roller according to claim 1, wherein the bars forming the tubular support structure are straight bars.

12. The roller according to claim 1, wherein the bars forming the tubular support structure are bars curved in the shape of a helical arc.

13. The roller according to claim 1, wherein the bars forming the tubular support structure are flat bars.

14. The roller according to claim 1, wherein the bars are uniformly distributed around the circumference of the circular end cheeks.

15. The roller according to claim 1, wherein the bars project radially relative to the circumference of the end cheeks.

16. The roller according to claim 1, wherein at least some of the tires are mounted adjacent to one another.

17. The roller according to claim 1, wherein the selected shape of the profile of the tires is a dome-shaped profile.

18. The roller according to claim 1, wherein
each of the plurality of bars of the tubular support structure is mounted on an outermost face of the end cheeks in a radial direction of the roller, and
the tires are mounted on the plurality of bars on an innermost face of each of the tires in the radial direction.

19. The roller according to claim 1, wherein each of the tires includes a hollow annular space positioned outward from the plurality of bars in a radial direction of the roller.

20. A roller of an agricultural machine that can be combined with a seed drill or a ground preparation tool, comprising:

a tubular support structure of horizontal axis adapted to be rotatably mounted on a tractor-drawn support frame; and
a series of semi-hollow tires having a profile of a selected shape, which are threaded onto the tubular support structure, enabling a series of parallel furrows to be formed in the earth,
wherein the tubular support structure comprises a framework made up of a plurality of bars joined together by two circular end cheeks between which these bars extend axially, and the tires are mounted on said bars of the framework to form an assembly that is connected for rotation and translation,
wherein an inner surface of the tires comprises axially oriented notches, and a shape and position of the notches are matched to the bars of the framework so as to prevent the tires from rotating relative to the tubular support structure, and
wherein each of the plurality of bars of the tubular support structure is mounted on an outermost face of the end cheeks in a radial direction of the roller, and the tires are mounted on the plurality of bars on an innermost face of each of the tires in the radial direction.

* * * * *